United States Patent
Alexander et al.

(10) Patent No.: US 11,170,214 B2
(45) Date of Patent: Nov. 9, 2021

(54) METHOD AND SYSTEM FOR LEVERAGING OCR AND MACHINE LEARNING TO UNCOVER REUSE OPPORTUNITIES FROM COLLABORATION BOARDS

(71) Applicant: JPMorgan Chase Bank, N.A., New York, NY (US)

(72) Inventors: Shawn Wesley Alexander, Pearland, TX (US); Richard John Carey, Darien, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 173 days.

(21) Appl. No.: 16/536,442

(22) Filed: Aug. 9, 2019

(65) Prior Publication Data
US 2020/0050853 A1 Feb. 13, 2020

Related U.S. Application Data

(60) Provisional application No. 62/716,661, filed on Aug. 9, 2018.

(51) Int. Cl.
*G06K 9/00* (2006.01)
*G06N 20/00* (2019.01)
*G06F 40/205* (2020.01)

(52) U.S. Cl.
CPC ....... *G06K 9/00624* (2013.01); *G06F 40/205* (2020.01); *G06N 20/00* (2019.01); *G06K 2209/01* (2013.01)

(58) Field of Classification Search
CPC .......... G06K 9/00624; G06K 2209/01; G06K 9/00456; G06K 9/4604; G06K 9/52; G06K 9/6267; G06K 9/66; G06K 9/6262; G06K 9/623; G06K 9/6253; G06F 40/205; G06F 19/321; G06F 16/5866; G06N 20/00; G06N 5/02; G06Q 10/101; G06Q 10/063; G06Q 30/02; G06Q 30/0269; G06Q 30/0277; G06T 7/0012; G06T 7/0083; G06T 2207/30004; G06T 7/0081; G06T 2207/10116; G06T 2207/30068; G06T 7/0085; G06T 7/60; G06T 7/12; G06T 7/11; G06T 7/174; G06T 1/00; G06T 7/00; G06T 7/0016; G06T 7/13; G06T 5/40; A61B 5/02007; A61B 5/7264; A61B 5/742; G01N 33/4833; G01N 33/48; G01N 33/5091
See application file for complete search history.

(56) References Cited

U.S. PATENT DOCUMENTS

| | | | |
|---|---|---|---|
| 10,891,477 B2 * | 1/2021 | Paget | G06F 40/289 |
| 2015/0324390 A1 * | 11/2015 | Macciola | G06K 9/3275 707/769 |
| 2018/0285321 A1 * | 10/2018 | Antony | G06K 9/6892 |

* cited by examiner

*Primary Examiner* — Duy M Dang
(74) *Attorney, Agent, or Firm* — Hunton Andrews Kurth LLP

(57) ABSTRACT

An embodiment of the present invention is directed to capturing collaboration boards in images, applying OCR and/or other recognition technology to read the collaboration boards and leveraging machine learning to query metadata repositories to identify reuse opportunities.

20 Claims, 3 Drawing Sheets

METHOD AND SYSTEM FOR LEVERAGING OCR AND MACHINE LEARNING TO UNCOVER REUSE OPPORTUNITIES FROM COLLABORATION BOARDS

CROSS REFERENCE TO RELATED APPLICATIONS

The application claims priority to U.S. Provisional Application 62/716,661, filed Aug. 9, 2018, the contents of which are incorporated herein in its entirety.

FIELD OF THE INVENTION

The present disclosure relates to systems and methods for leveraging OCR and machine learning to uncover reuse opportunities from collaboration boards.

BACKGROUND OF THE INVENTION

Within a business, multiple groups or individuals may work on the same component or software feature applied to different projects. Across different groups, there may be reuse or repurposing opportunities. These different groups have no quick, easy way to know, however, that other groups are working on or have worked on the same feature or component. The feature overlap may cause redundant, wasteful work to be performed as multiple developers might create the same feature from scratch.

These and other drawbacks exist with known systems and processes.

SUMMARY OF THE INVENTION

Exemplary embodiments provide a system and method for leveraging OCR and machine learning to uncover reuse opportunities from collaboration boards. According to one embodiment, a computer-implemented method comprises the steps of: receiving recorded features and requirements on a collaboration interface; receiving captured one or more digital images associated with the collaboration interface; uploading the one or more digital images to one or more servers; processing the one or more digital images on the one or more servers into text and graphics via optical character recognition (OCR); applying a machine learning algorithm to extract key phrases and concepts from the text and graphics; identifying potential reuse opportunities by searching the extracted key phrases and concepts in one or more repositories of metadata associated with existing or work-in-progress systems; calculating a confidence score for each identified potential reuse opportunity; and ranking the potential reuse opportunities based at least in part on calculated confidence score.

According to another embodiment, a computer implemented system comprises: an electronic input configured to receive image data from one or more cameras associated with a collaborative interface; a database that stores and manages image data from one or more collaborative interfaces; a server, coupled to the electronic input and the database, configured to perform the steps of: receiving, via the electronic input, recorded features and requirements on a collaboration interface; receiving, via the one or more cameras, captured digital images associated with the collaboration interface; uploading the one or more digital images to the server; processing, via optical character recognition (OCR) processor, the one or more digital images on the one or more servers into text and graphics; extracting, via a machine learning engine, key phrases and concepts from the text and graphics; identifying potential reuse opportunities by searching the extracted key phrases and concepts in one or more repositories of metadata associated with existing or work-in-progress systems; calculating a confidence score for each identified potential reuse opportunity; and ranking the potential reuse opportunities based at least in part on calculated confidence score.

Exemplary embodiments may provide a number of advantages to a business or organization in need of an improved method to uncover reuse opportunities and reduce redundant development work. Embodiments support leveraging OCR and machine learning to uncover reuse opportunities from collaboration boards and to score those reuse opportunities based on various metadata associated with the underlying systems. Embodiments also support storing new software and software components into a searchable repository to be used later. Accordingly, the various embodiments of the present invention may realize efficiencies, improve productivity and gather meaningful feedback. These and other advantages will be described further in the detailed description below.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

An embodiment of the present invention is directed to capturing images associated with collaboration boards or interfaces, applying OCR and/or other recognition technology to read the collaboration boards or interfaces, and leveraging machine learning to query metadata repositories to identify reuse opportunities.

In designing or documenting software interfaces, a set of developers may begin by determining what feature capabilities are needed in order to deliver value to the business. Some or all of these features may already be in place or in progress somewhere within the same organization. With this knowledge, the developers may take advantage of a reuse or repurposing opportunity in order to avoid having to recreate an existing feature, thus saving time and resources. Identifying which features exist in a business' infrastructure, and who within the business is knowledgeable of those features, however, is a non-trivial task. There may be thousands of repositories both within and without the business with potentially relevant software and software components. The time it takes for a developer to search for a useful, existing feature available to him or her, if one even exists, may exceed the time it would take to re-write the feature from scratch.

An embodiment of the present invention is directed to assisting a user in uncovering reuse opportunities from collaboration boards. Groups within a business often tackle problems by having individual members collaborate around analog or digital collaboration boards, such as whiteboards, to help identify new product or software features, plan new architectures, and roadmap new capabilities for applications.

An embodiment of the present invention is directed to harvesting metadata effectively from collaboration tools, identifying links between different collaboration tools and other existing systems, and making intelligent suggestions for reuse opportunities. An embodiment of the present invention may assist groups, such as software developers, to identify where systems or features may already be in place and who in the organization may be knowledgeable about them.

Figure 1:
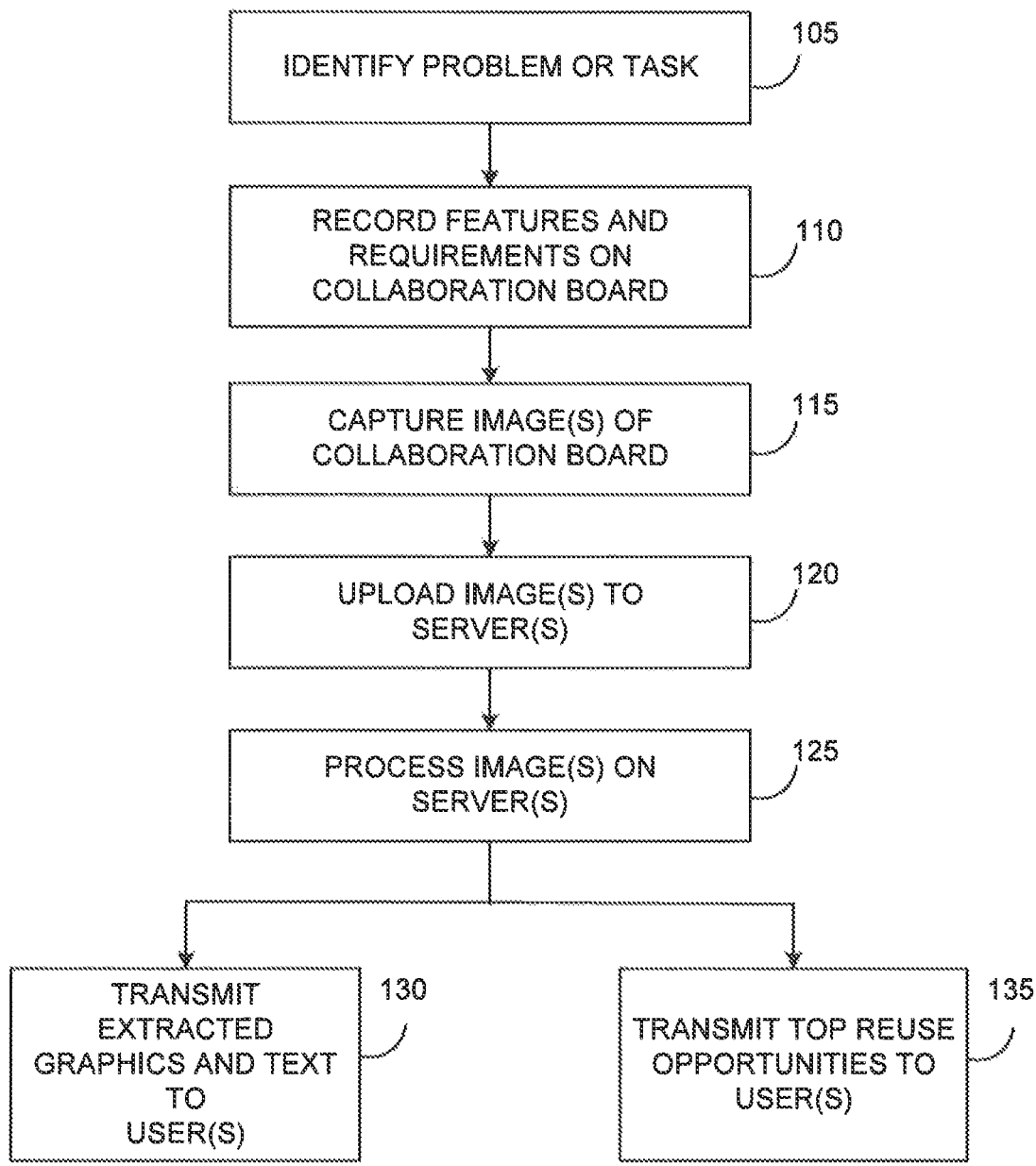
FIG. 1 is a flowchart illustrating a method for leveraging OCR and machine learning to uncover reuse opportunities from collaboration boards, according to an embodiment of the present invention.

FIG. 1 is a flowchart illustrating a method for leveraging OCR and machine learning to uncover reuse opportunities from collaboration boards, according to an embodiment of the present invention. While the process of FIG. 1 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

In step 105, one or more users may identify a problem or task.

In step 110, the one or more users may use a digital or analog collaboration tool to record planned features, architectures, roadmaps, design and specification requirements, etc. In one embodiment, the collaboration tool may be a digital or analog whiteboard.

In step 115, one or more digital images of the digital collaboration tool may be captured. In one embodiment, the one or more digital images may be captured by a user on his or her phone, tablet computer, digital camera, web camera, Internet of Things (IoT) appliance, etc.

In step 120, the one or more digital images may be uploaded to one or more servers on a network. In one embodiment, the one or more digital images may be uploaded to a private repository on a business' network.

In step 125, the one or more servers may process the digital images via OCR into text and graphics. The text may be parsed for key words, and machine learning may be applied to determine key phrases and concepts embodied in the collaboration capture data. These key phrases and concepts may be compared against one or more repositories of metadata from existing or work-in-progress systems to identify possible reuse opportunities with related features and/or APIs. Reuse opportunities may be ranked according to a calculated confidence score and/or other metric or calculation. In one embodiment, the processing may be carried out by multiple servers, which need not be in the same geographic location.

Examples of digital image processing are disclosed in U.S. patent application Ser. No. 16/033,697, the disclosure of which is hereby incorporated, by reference, in its entirety.

In step 130, the extracted text and graphics may be sent back to the one or more users for review. In one embodiment, the extracted text and graphics may be uploaded to a software content collaboration system, for example a Confluence page for the users' project. A software content collaboration system, such as Confluence, may provide documentation for an application, business process, team, project, or software, with a user-friendly UI, for example with a UI similar to a web page.

In step 135, the top reuse opportunities based on confidence scores may be transmitted to the one or more users for review. In one embodiment, the reuse opportunities may be automatically added to a software development tracking tool, for example as tickets in JIRA. A software development tracking tool, such as JIRA, may act as a ticketing system that enables teams of employees to manage a queue of work. Each work item, or ticket, may move into various stages as the item is worked on, for example "to be done," "in progress," "complete," or "released." A software development tracking tool may allow the owners of the system and the team members to visualize work that has been completed, is in progress, or needs to be assigned and worked on.

Figure 2:
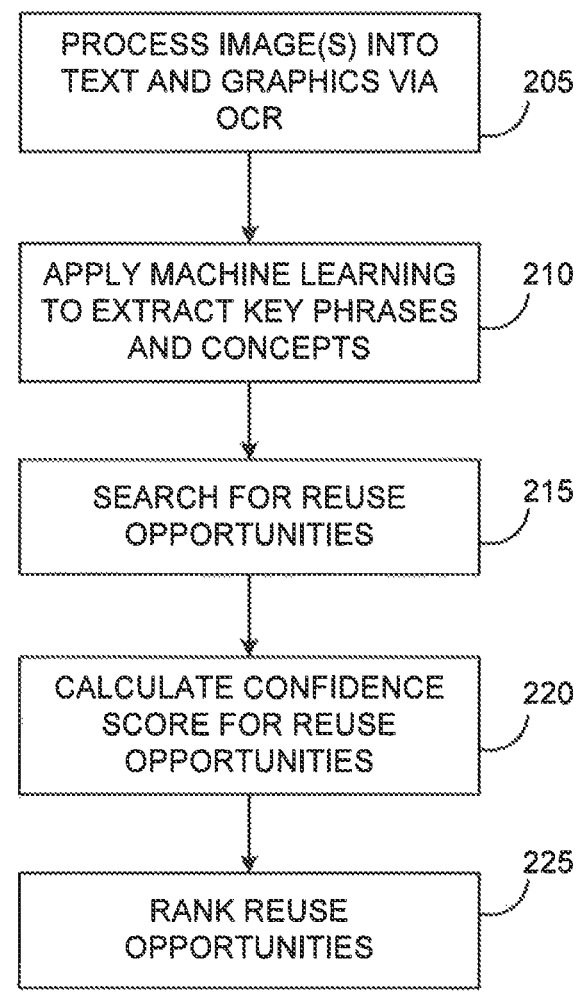
FIG. 2 is a flowchart illustrating a method for processing images on a server, according to an embodiment of the present invention.

FIG. 2 is a flowchart illustrating a method for processing images on a server, according to an embodiment of the present invention. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

In step 205, the one or more servers may process uploaded digital images into text and graphics via, for example, optical character recognition (OCR) or other text recognition technology. In one embodiment, the one or more servers may also process metadata from a source of the image(s), including user information, department information, project information, geographic information and/or other data. The one or more servers may record, for example, that the images came from a software development employee working within the organization's UI development department as a part of a team, including employees from other departments, working on a particular project for internal banking software at an office in New York.

In another embodiment, the one or more servers, as a part of the OCR process, may also process relative position and sizing data. For example, the OCR process may identify the distance between text, groups of text, and/or graphics as well as relative sizing of text and images.

In step 210, the one or more servers may apply a machine learning algorithm to the text and graphics to extract key phrases and concepts. In one embodiment, the machine learning process may search for a pattern or grouping of words and images that correspond to concepts in the one or more repositories of metadata. For example, the machine learning process may associate certain word groupings with specification requirements. For example, the words "AWS," "Amazon Web Services," and/or "Azure," when positioned near the word "cloud," may be associated with a requirement for a third party cloud service provider as a part of the project. Words positioned higher up on a board in large font may be interpreted differently than words lower down on a board or in a relatively smaller font.

In another embodiment, the machine learning process may apply association rule learning. For example, the machine learning process may receive text through the OCR processing that reads "lookup employee information." The machine learning process may then apply association rule learning to determine that "lookup" means "to extract" and that "employee information" means, for example, "bank employee information." The machine learning process may then query an existing database of bank employee APIs, which may return an HR system API that detects employee information. The system may then output a recommendation to leverage the HR system's API.

In another embodiment, the machine learning process may apply a similarity learning technique. For example, the machine learning process may receive text through the OCR processing that reads "calculate positional risk." The machine learning process may then apply a similarity learning technique to determine various types of "risk" that may be calculated within the business or organization. The machine learning process may score which "risk" is likely implied by the input based on other collaboration board submissions for the same feature or from the same group. The APIs that are built and available for reuse for the risk types that are most likely to be correct may be provided back to the user for review.

In another embodiment, the machine learning algorithm may adapt over time to feedback from users. When users review the proposed reuse opportunities, for example, they may indicate whether the suggestion was helpful or whether it was a false positive. The machine learning algorithm may learn from this user feedback data over time.

In step 215, the one or more servers may search for possible reuse opportunities by comparing the extracted key phrases and concepts against one or more repositories of metadata from existing and work-in-progress systems. In one embodiment, the one or more repositories may include both repositories internal to the organization and external repositories, for example open source repositories.

In step 220, the one or more servers may calculate a confidence score for each reuse opportunity based on the reuse opportunity's stored metadata. Confidence scores may be higher for opportunities that are stable, resilient, and/or good quality based on the information available. In one embodiment, the confidence score may be calculated based on functional, organization, and non-functional attributes of the reuse possibility. The confidence score may be based on, for example, feature capabilities, strategic implementation and architecture, code quality, number of production defects, number of support tickets, performance, ability to run on the infrastructure requested by the team, reuse design and development, number of times already reused within the organization, user score from teams having previously reused the system, and/or geographic location of the user or group associated with the reuse opportunity.

Feature capabilities may include information about the features requested in the input submission. For example, a feature may be requested that queries HR data. Strategic implementation and architecture may include information about whether an identified reuse opportunity is strategic for the business and whether the architecture of the reuse opportunity is similar to the application architecture required by the current system. Code quality may include quantitative metrics about the quality of code to be reused, for example unit test coverage, regression test coverage, integration test coverage, number of code violations, number of code changes in the last 90 days, cyclomatic complexity, and the number and severity of security vulnerabilities. The number of production defects may include information such as the number of production defects in the latest release, the number of production defects in the last 90 days, and the number of production defects in the last year. The number of support tickets may include, for example, the number of defects entered for the latest release in the reuse candidate's associated software development tracking tool. Performance may include information such as the performance scalability and load testing results, for example measured in transactions per second. The ability to run on the infrastructure requested by the team may be based on the application platforms of the current system and the reuse opportunity. For example, a Linux process may not be able to run on a Windows architecture reliably. The reuse design and development scoring factor may include information about whether the reuse opportunity consists of easily extracted components or is a monolithic application. The number of times reused may indicate whether there is a history of reuse that indicates the component may be successfully reused again. The user score of reuse may indicate whether prior individuals or groups reusing the component found it useful. Geographic location may indicate how close the development teams are for the purposes of onboarding or integration.

In step 225, the reuse opportunities may be ranked by confidence score, and the opportunities with the highest confidence scores may be selected for transmission to the one or more users. The reuse opportunities may then be presented to the user. For example, only a certain number (e.g., the five highest confidence-rated reuse opportunities) may be presented to the user). In another embodiment, a minimum confidence threshold may be applied, such that reuse opportunities below that threshold are not considered. Other metrics and/or ranking parameters may be applied.

In some situations, there may be no reuse opportunities identified at step 215, or the confidence scores calculated at step 220 may be too low. In one embodiment, these situations may be flagged for further review. The one or more users may then review the flagged reuse search results to determine whether the image was properly processed and how important the feature is to the project if no reuse opportunity exists. If the image was properly processed and the one or more users identify the feature as necessary, the one or more users may register the work-in-progress feature with the searchable repository as a unique reuse opportunity, to be added to the metadata repository.

Embodiments may provide advantages by allowing easy identification of reuse capabilities, including the ability to identify the likelihood of successful reuse through the confidence scoring algorithm. These opportunities may be identified at an early stage, before development has begun and time has been spent on redundant feature development. Further, reviewing and tracking the scoring of reuse opportunities by other groups within an organization may provide contacts for inter-group discussions of reuse capabilities as well as providing a better scoring system. Identification of reuse opportunities may be automated from uploading an image capture to the one or more servers for processing.

Figure 3:
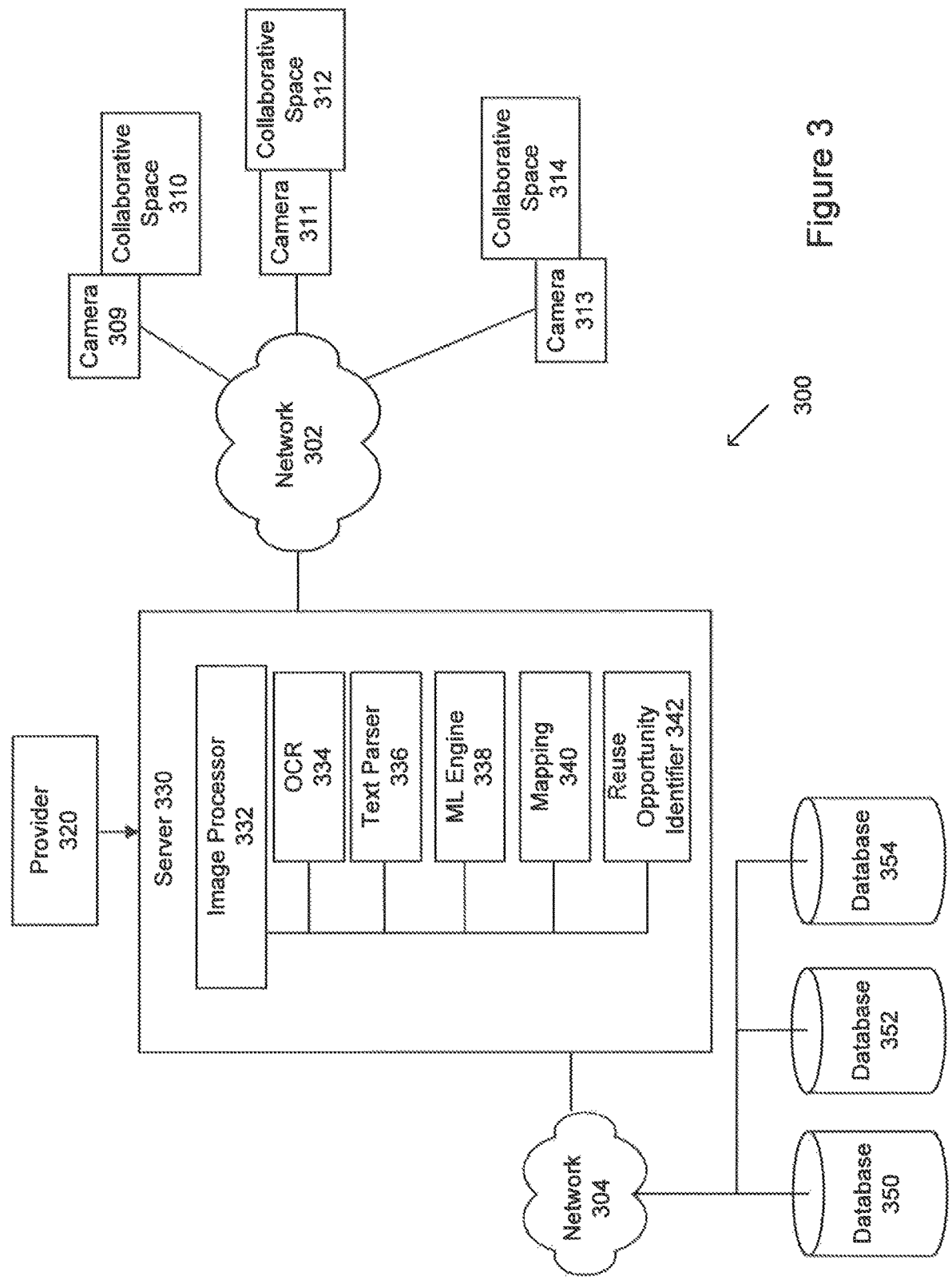
FIG. 3 illustrates a system that implements OCR and Machine Learning to capture and process images and data from collaboration interfaces, according to an embodiment of the present invention.

FIG. 3 illustrates a system that implements OCR and Machine Learning to capture and process images and data from collaboration interfaces, according to an embodiment of the present invention. As shown in FIG. 3, System 300 includes processing components, modules and functions. Server 330 may communicate with a plurality of Collaborative Interfaces represented by 310, 312 and 314 via a camera device or system represented by 309, 311 and 313, respectively. Image data may be captured and transmitted to Server 330. According to an exemplary implementation, Server 330 may include Image Processor 332 with various functions and modules including OCR 334, Text Parser 336, Machine Learning (ML) Engine 338, Mapping 340 and Reuse Opportunity Identifier 342 and various networking and communication components. Other functions and services may be supported. The components illustrated in FIG. 3 are merely exemplary, other devices may be represented in various applications. While a single component is illustrated, each component may represent multiple components.

OCR 334 may represent an optical character recognition tool or other recognition technology. OCR 334 may process the image data to identify corresponding text, images, diagrams, architectures, etc. Text Parser 336 may identify keywords from the processed image data. Machine Learning (ML) Engine 338 may determine key phrases and concepts associated with the processed image. Mapping 340 may then map the key phrases and concepts into existing reuse opportunities identified by Reuse Opportunity Identifier 342. Reuse opportunities may include APIs, applications, systems, technologies, tools and/or other processes.

According to an exemplary application, a team of programmers/coders may collaborate on various projects in different locations. The programmers/coders may work independently or collaboratively via a video conference system. The collaborative space may represent an interactive interface, a whiteboard or other manner of collaboration that may be captured by an image capturing device, e.g., camera.

An embodiment of the present invention is directed to leveraging OCR technology to process documentation that teams build and/or contribute to. In a collaborative environment, teams may build documentation on a digital interface, whiteboard, sticky notes, note pad and/or other collaborative tool or medium. An embodiment of the present invention may leverage OCR to capture diagrams, texts and/or images generated in a collaborative environment. For example, a camera (or mobile phone) may periodically capture progress made on a collaborative space or interface. The camera (or mobile phone) may capture images and then transmit to a server where the images may be processed to identify or interpret text, images and then render the text, images by the server to be then transmitted and/or shared with various participants during the collaborative session. The processing may involve OCR technology, machine learning and other text or image processing. According to another example, the OCR and image processing may occur at the collaborative interface and/or the camera device.

An embodiment of the present invention may be directed to managing the collaborative space or interface and then sharing the captured images and/or text with a plurality of participants or recipients on various devices. In this example, the collaborative progress and interactions may be shared in real-time. For example, multiple participants may be in a video conference across various locations. A first participant may generate images on a whiteboard or digital interface/screen. In this example, a camera device (or other screen capture device) may capture the images on the whiteboard, send the images to a server where the server may apply image processing (e.g., including OCR and machine learning, etc.) to generate text and images. The OCR-ed text and images may then be transmitted and shared with the participants in real-time (or near real-time) of the video conference. The camera may be associated with the video conference system or a separate mobile device. An embodiment of the present invention may be directed to syncing the images while additional edits and modifications are made to the whiteboard. In addition, other participants may contribute to the shared image on a corresponding screen. The images may be captured, transmitted and processed so that edits and modifications may be shared with the other participants. Accordingly, by using OCR technology to render text and/or images, each participant may be able to view and edit in real-time.

For example, a camera (or other image capture device) may capture images of a collaborative space at periodic intervals (or when edits are made). The camera may detect a change (or change threshold) from a previous image and then capture an updated image. The images may be transmitted to a server for image processing which may include applying OCR or other recognition technology to the images. The processed images may then be shared with one or more other participants.

Server 330 may be hosted by a financial institution or other entity. According to another example, Server 330 may be supported by a third party service provider 320. Other scenarios and architectures may be implemented.

Server 330 may store and access data from various database components, including Database 350, 352 and 354. For example, Database 350 may store and manage image capture data. Databases may be internal or external to Server 330. Data may be stored and managed in storage components, represented by Database 350, via Network 304. Server 330 may be communicatively coupled to Databases, represented by 350, 352, 354. Databases may include any suitable data structure to maintain the information and allow access and retrieval of the information. The storage may be local, remote, or a combination thereof with respect to Databases. Communications with Databases may be over a network, or communications may involve a direct connection between Databases and System 330, as depicted in FIG. 3. Databases may also represent cloud or other network based storage.

Network 302, 304 may be communicatively coupled with various components in a network. Users of Collaborative Interfaces 310, 312 and 314 may include coders, programmers, contractors, and/or various employees associated with Provider 320. For example, Camera device or system may communicate image data from Collaborative Interfaces to Server 332 via Network 302. Server 330 may communicate with various users, using any mobile or computing device, such as a laptop computer, a personal digital assistant, a smartphone, a smartwatch, smart glasses, other wearables or other computing devices capable of sending or receiving network signals.

The system 300 of FIG. 3 may be implemented in a variety of ways. Architecture within system 300 may be implemented as hardware components (e.g., module) within one or more network elements. It should also be appreciated that architecture within system 300 may be implemented in computer executable software (e.g., on a tangible, non-transitory computer-readable medium) located within one or more network elements. Module functionality of architecture within system 300 may be located on a single device or distributed across a plurality of devices including one or more centralized servers and one or more mobile units or end user devices. The architecture depicted in system 300 is meant to be exemplary and non-limiting. For example, while connections and relationships between the elements of system 300 are depicted, it should be appreciated that other connections and relationships are possible. The system 300 described below may be used to implement the various methods herein, by way of example. Various elements of the system 300 may be referenced in explaining the exemplary methods described herein.

Network 302, 304 may be a wireless network, a wired network or any combination of wireless network and wired network. Although Network 302, 304 is depicted as one network for simplicity, it should be appreciated that according to one or more embodiments, Network 302, 304 may comprise a plurality of interconnected networks, such as, for example, a service provider network, the Internet, a cellular network, corporate networks, or even home networks, or any of the types of networks mentioned above. Data may be transmitted and received via Network 302, 304 utilizing a standard networking protocol or a standard telecommunications protocol.

An embodiment of the present invention may be directed to an augmented reality (AR) application. In this application, images may be captured with an augmented reality device (e.g., lenses, glasses, headset, etc.) and then rendered or shared with other participants via augmented reality or a digital screen. For example, a user may capture text and/or images from a collaborative interface (e.g., whiteboard, digital interface, screen, paper, note, etc.) with an AR device (e.g., AR lenses, glasses, headset, etc.). The captured images may be processed via OCR or other recognition technology and then shared or transmitted to one or more other users via various modes of delivery, e.g., mobile device, interactive screen, AR device, etc.

An embodiment of the present invention may be directed to a projector implementation, e.g., Bluetooth projector. In this example, an AR device, e.g., AR glasses, may detect gestures including hand movements and manipulation of a projected image. The manipulation (e.g., moving a square that is projected, etc.) may be captured, recorded, and subsequently rendered through the projector. The rendering is not isolated to the user and the projector, but may be simultaneously transmitted to other receiving devices, e.g., projectors, monitors, displays, AR devices, in communication with a network for sharing and collaboration. In this manner, various participants in the network with access to the image may view the image, manipulate, interact and collaborate in real time.

An embodiment of the present invention is directed to applying machine learning to processing of the captured images. An embodiment of the present invention may be directed to translating handwritten notes into text, images, etc. An embodiment of the present invention is directed to applying machine learning to recognize various handwritings and identifying corresponding text in an appropriate context. An embodiment of the present invention may also recognize different colors, shapes, images, acronyms, etc. For example, notes may be scribbled on a colored sticky note or other non-white background. An embodiment of the present invention may recognize the varying colors and apply a grey scale to better enhance and capture the written notes. During a collaborative session, participants oftentimes communicate using acronyms, abbreviations, shorthand, and other shorten form of text. An embodiment of the present invention may build a knowledge base of common terms, acronyms, abbreviations, etc. An embodiment of the present invention may access the knowledge base when processing the images at the server. This knowledge base may further provide additional context and understanding when processing the images as well as training data to improve image processing.

According to another example, an embodiment of the present invention may recognize various participants and apply a customized profile or preferences. For example, an embodiment of the present invention may identify a particular user as a conference participant through a meeting invite as well as voice recognition or other modes of identification. An embodiment of the present invention may recognize the particular user and further understand that the particular user uses a specific set of acronyms and/or short hand notation. According to another example, an embodiment of the present invention may recognize a user's profile or background and apply a set of terms that are specific to the user's profile (e.g., department, team, group, specialty, expertise, etc.). For example, a programmer may use different terms than someone in the accounting department. Other custom preferences and profile information may be applied.

An embodiment of the present invention may be directed to a validation enrichment phase for image processing. An embodiment of the present invention may enable a user to verify and/or correct text and/or image captures. According to another embodiment of the present invention, a user may verify and/or correct captured images as the image is initially captured. This may be applied to a Virtual Reality (VR)/Augmented Reality (AR) embodiment so that other participants may confirm, correct and/or agree on the captured image translation. This provides a live, real-time correction and/or verification as the images are being captured.

Hereinafter, general aspects of implementation of the systems and methods of the embodiments will be described.

The system of the embodiments or portions of the system of the embodiments may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the embodiments may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the embodiments.

The processing machine used to implement the embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the methods as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment, be performed by a single component. Further, the processing performed by one distinct component as described above may be performed by two distinct components. In a similar manner, the memory storage performed by two distinct memory portions as described above may, in accordance with a further embodiment, be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the embodiments. Rather, any number of different programming languages may be utilized as is necessary and/or desirable.

Also, the instructions and/or data used in the practice of the embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, e.g., the software that enables the computer operating system to perform the operations described above, may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the embodiments may take on any of a variety of physical forms or transmissions. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the embodiments.

Further, the memory or memories used in the processing machine that implements the embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the embodiments, a variety of "user interfaces" may be utilized to allow a user to interface with the processing machine or machines that are used to implement the embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method of the embodiments may interact partially with another processing machine or processing machines, while also interacting partially with a human user.

It will be readily understood by those persons skilled in the art that the present embodiments are susceptible to broad utility and application. Many embodiments and adaptations other than those herein described, as well as many variations, modifications and equivalent arrangements, will be apparent from or reasonably suggested by the present embodiments and foregoing description thereof, without departing from the substance or scope of the invention.

Accordingly, while the present exemplary embodiments have been described here in detail, it is to be understood that this disclosure is only illustrative and exemplary and is made to provide an enabling disclosure of the invention. Accordingly, the foregoing disclosure is not intended to be construed or to limit the present embodiments or otherwise to exclude any other such embodiments, adaptations, variations, modifications or equivalent arrangements.

What is claimed is:

1. A computer-implemented method that leverages optical character recognition (OCR) and machine learning to uncover reuse opportunities from collaboration interfaces, the method comprising the steps of:
    receiving recorded features and requirements on a collaboration interface comprising one or more of text and graphics;
    receiving captured one or more digital images associated with the collaboration interface;
    uploading the one or more digital images to one or more servers;
    processing the one or more digital images on the one or more servers into text and graphics via optical character recognition (OCR);
    applying a machine learning algorithm to extract key phrases and concepts from the text and graphics;
    identifying potential reuse opportunities for existing or work-in-progress systems by searching the extracted key phrases and concepts in one or more repositories of metadata associated with the existing or work-in-progress systems;
    calculating a confidence score for each identified potential reuse opportunity; and
    ranking the potential reuse opportunities based at least in part on calculated confidence score.

2. The method of claim 1, wherein the step of calculating a confidence score for a potential reuse opportunity is based on one or more of the following attributes of the potential reuse opportunity stored in the metadata associated with the existing or work-in-progress systems: feature capabilities, strategic implementation and architecture, code quality, number of production defects, number of support tickets, performance, ability to run on an infrastructure requested by a team, reuse design and development, number of times already reused within an organization, user score from teams having previously reused the system, and geographic location of a user or group associated with the potential reuse opportunity.

3. The method of claim 1, further comprising the step of automatically uploading the text and graphics to a content collaboration system.

4. The method of claim 3, wherein the content collaboration system is accessible by one or more participants in real-time.

5. The method of claim 1, further comprising the step of automatically uploading the ranked potential reuse opportunities to a software development tracking tool.

6. The method of claim 1, wherein the step of ranking the potential reuse opportunities further comprises excluding from consideration potential reuse opportunities below a threshold confidence score.

7. The method of claim 1, further comprising the step of performing validation enrichment for the text and graphics.

8. The method of claim 1, wherein the collaboration interface comprises a digital interactive interface.

9. The method of claim 1, wherein the collaboration interface comprises a whiteboard.

10. The method of claim 1, wherein the collaboration interface comprises an augmented reality device.

11. A computer implemented system that leverages optical character recognition (OCR) and machine learning to uncover reuse opportunities from collaboration interfaces, the system comprising:
    an electronic input configured to receive image data from one or more cameras associated with a collaborative interface;
    a database that stores and manages image data from one or more collaborative interfaces;
    a server, coupled to the electronic input and the database, configured to perform the steps of:
    receiving, via the electronic input, recorded features and requirements on a collaboration interface comprising one or more of text and graphics;
    receiving, via the one or more cameras, captured digital images associated with the collaboration interface;
    uploading the one or more digital images to the server;
    processing, via optical character recognition (OCR) processor, the one or more digital images on the one or more servers into text and graphics;
    extracting, via a machine learning engine, key phrases and concepts from the text and graphics;
    identifying potential reuse opportunities for existing or work-in-progress systems by searching the extracted key phrases and concepts in one or more repositories of metadata associated with the existing or work-in-progress systems;
    calculating a confidence score for each identified potential reuse opportunity; and
    ranking the potential reuse opportunities based at least in part on calculated confidence score.

12. The system of claim 11, wherein the confidence score for a potential reuse opportunity is based on one or more of the following attributes of the potential reuse opportunity stored in the metadata associated with the existing or work-in-progress systems: feature capabilities, strategic implementation and architecture, code quality, number of production defects, number of support tickets, performance, ability to run on an infrastructure requested by a team, reuse design and development, number of times already reused within an organization, user score from teams having previously reused the system, and geographic location of a user or group associated with the potential reuse opportunity.

13. The system of claim 11, wherein the server is further configured to perform the step of: automatically uploading the text and graphics to a content collaboration system.

14. The system of claim 13, wherein the content collaboration system is accessible by one or more participants in real-time.

15. The system of claim 11, wherein the server is further configured to perform the step of: automatically uploading the ranked potential reuse opportunities to a software development tracking tool.

16. The system of claim 11, wherein ranking the potential reuse opportunities further comprises excluding from consideration potential reuse opportunities below a threshold confidence score.

17. The system of claim 11, wherein the server is further configured to perform the step of: performing validation enrichment for the text and graphics.

18. The system of claim 11, wherein the collaboration interface comprises a digital interactive interface.

19. The system of claim 11, wherein the collaboration interface comprises a whiteboard.

20. The system of claim 11, wherein the collaboration interface comprises an augmented reality device.

* * * * *